United States Patent [19]

Tabana et al.

[11] 4,173,561

[45] Nov. 6, 1979

[54] FLAME RETARDANT POLYMER COMPOSITION

[75] Inventors: Minoru Tabana, Suita; Noriyuki Sekine; Tatsuyuki Mitsuno, both of Toyonaka; Akira Kinoshita, Ibaraki, all of Japan

[73] Assignee: Sumitomo Chemical Company, Limited, Osaka, Japan

[21] Appl. No.: 866,905

[22] Filed: Jan. 4, 1978

[30] Foreign Application Priority Data

Jan. 12, 1977 [JP] Japan .................................. 52/2653
Jan. 13, 1977 [JP] Japan .................................. 52/3111

[51] Int. Cl.$^2$ .......................... C08K 5/34; C08K 5/13; C08K 5/06
[52] U.S. Cl. .......................... 260/45.75 B; 260/45.7 R; 260/45.7 RT; 260/45.8 NT; 260/45.85 B; 260/45.95 F; 260/45.95 G
[58] Field of Search ................ 260/45.75 B, 45.7 RL, 260/45.95 G, 45.8 NT, 45.95 F, 45.85 B, 45.7 R

[56] References Cited

U.S. PATENT DOCUMENTS

| | | | |
|---|---|---|---|
| 3,516,959 | 6/1920 | Jonas | 260/42.16 |
| 3,720,643 | 3/1973 | Abu-Isa et al. | 260/42.49 |
| 3,832,422 | 8/1974 | Little et al. | 260/45.7 RL |
| 3,862,070 | 1/1975 | Fukushima et al. | 260/45.7 R |
| 3,869,420 | 3/1975 | Mathis et al. | 260/42.49 |
| 3,883,481 | 5/1975 | Kopetz et al. | 260/45.95 G |
| 3,897,346 | 7/1975 | Vogel | 260/37 R |

OTHER PUBLICATIONS

Fire Retardants: Proceedings of 1974 International Symposium on Flammability and Fire Retardants — Bhatnagar — (1975) pp. 68 to 85 and 162 to 179.

Primary Examiner—Veronica P. Hoke
Attorney, Agent, or Firm—Stevens, Davis, Miller & Mosher

[57] ABSTRACT

Resin compositions excellent in both flame retardation and weather durability, comprising (1) a styrene resin, (2) a halogen-containing flame retarder such as decabromodiphenyl ether and (3) an inorganic hydrate compound such as diatomaceous earth or a magnesium compound such as magnesium hydroxide and oxide.

8 Claims, No Drawings

FLAME RETARDANT POLYMER COMPOSITION

The present invention relates to flame-retardant, weather-durable styrene resin compositions.

Styrene resins are of low cost and are superior in processability and mechanical and electrical properties, and their molded products have a good appearance. Accordingly, the resins are so far widely used for household electric applicances and furniture.

Since, however, styrene resins are so easily inflammable their use is limited in many respects.

Recently, from the necessary of safety against fire, there is emphasized a desire to make styrene resins flame-retardant, and the desire becomes stronger as Underwriters Laboratories Standard in U.S.A (referred to as "UL Standard" hereinafter) becomes more severe year by year.

In order to impart a flame retardance to styrene resins, it is well known that a series of compounds called flame retarders, for example organo-halogen compounds, phosphoric ester compounds and compounds containing both halogen and phosphorus, and flame retarding assistants such as antimony trioxide are added to sytrene resins. This method is difficult to make styrene resins completely non-inflammable, but it is capable of giving a flame retarding property or self-extinguishing property to the resins. Since, however, this method needs an extremely large quantity of flame retarder, the weather durability of the resins is lowered without exception. The lowered weather durability is improved to some degree by the addition of ultraviolet ray absorbers. But, particularly when high flame retarding properties, for example, those corresponding to the ratings, V-1 and V-0, of UL Standard are required, the deterioration of weather durability can not be sufficiently improved merely by the addition of ultraviolet ray absorber, and it is not desirable to use an extremely large quantity of flame retarder for the preparation of molded products having a pale color. As described above, it is very difficult to give both high flame retardance and high weather durability to styrene resin-based compositions.

The inventors extensively studied to develop styrene resin compositions combining a high flame retarding property and high weather durability without damaging the properties of the styrene resins. As a result, it was found that the objective styrene resin compositions can be obtained by the addition of a halogen-containing flame retarder and a particular inorganic compound to styrene resins.

The present invention provides a resin composition comprising
(1) a styrene resin,
(2) 3 to 40 parts by weight based on 100 parts by weight of the sytrene resin of a halogen-containing flame retarder, and
(3) as an inorganic compound 0.1 to 10 parts by weight based on 100 parts by weight of the styrene resin of (a) at least one inorganic hydrate compound selected from diatomaceous earth, kaolin, alumina hydrate and talc, or (b) at least one magnesium compound selected from magnesium hydroxide, magnesium oxide and basic magnesium carbonate, provided that the halogen-containing flame retarder isdecabromodiphenyl ether in an amount of 11 to 30 parts by weight based on 100 parts by weight of the sytrene resin when the inorganic compound is the magnesium compound.

In the present invention, the preferred resin composition comprises
(1) a styrene resin,
(2) 11 to 30 parts by weight based on 100 parts by weight of the styrene resin of decarbomodiphenyl ether as the halogen-containing flame retarder,
(3) 0.1 to 10 parts by weight based on 100 parts by weight of the sytrene resin of the magnesium compound, and
(4) 0.1 to 5 parts by weight based on 100 parts by weight of the styrene resin of an ultraviolet ray absorber, which composition exhibits a flame retarding property corresponding to V-1 and V-0 of the UL Standard, and is excellent in weather durability, and moreover can also be applied to different fields wherein a high thermal resistance is required, such as electric parts.

The sytrene resins referred to herein include polystyrene, rubber-modified polystyrene (referred to as "HI polystyrene" hereinafter), polymethylstyrene, styrene-butadiene copolymers, styrene-acrylonitrile copolymers (referred to as "AS resin" hereinafter), styrene-butadiene-acrylontrile terpolymers (referred to as "ABS resin" hereinafter) and mixtures thereof. Further, the styrene resins of the present invention may contain elastomeric substances such as polybutadiene rubber and styrene-butadiene rubber, unless these substances do damage to the characteristic properties of the sytrene resins.

The halogen-containing flame retarders used in the present invention include tetrabromobisphenol A (such as Fireguard FG 2000, trade name, produced by Teijin Kasei Co.), tetrabromophthalic anhydride, hexabromobenzene (such as FR-B, trade name, produced by Nippo Kagaku Co.), pentabromotoluene, pentabromophenol, tris(2,3-dibromopropyl)phosphate, tris(2-chloro-3-bromopropyl)phosphate, tribromophenylallyl ether, tribromophenyl 2,3-dibromopropyl ether, tribromophenyl 1,3-dibromoisobutyl ether (such as Pyroguard SR-100, trade name, produced by Daiichi Kogyo Seiyaku Co.), octabromodiphenyl ether, decabromodiphenyl ether (such as Puraneron DB-101, trade name, produced by Mitsui Toatsu Fine Co., and other commercially available retarders having a melting point of about 300° C. and a bromine content of about 81%), octabromobiphenyl, pentachloropentacyclodecane, hexabromocyclododecane and the like.

In the present invention, the weight ratio of the styrene resin to the halogen-containing flame retarder is 100 parts by weight to 3 to 40 parts by weight. When the amount of the retarder is less than 3 parts by weight based on 100 parts by weight of the styrene resin, the resin compositions obtained have no satisfactory flame retarding property. The flame retarding property is not very much improved even when the amount exceeds 40 parts by weight, and besides other physical properties are damaged. It is necessary that the kind and amount of the flame retarder be properly determined depending upon the intended use of the compositions produced and the degree of flame retarding property required for the compositions. For example, for uses in which thermal resistance is regarded as particularly essential as electric materials, it is desirable to add a high-melting flame retarder having a melting point of higher than 250° C., for example hexabromobenzene and decabromodiphenyl ether. In order to obtain a flame retarding property corresponding to the rating V-2, and V-1 or V-0 in UL Standard, it is desirable to use the flame retarder in an amount of 3 to 10 parts by weight, and 11 to 40 parts by weight, respectively, and in order to obtain flame retarding properties corresponding to V-1 and V-0, preferred amounts of decarbomodiphenyl ether added are 11 to 14 parts by weight and 15 to 30 parts by weight, respectively, when the magnesium compounds are used as the inorganic compound.

In the present invention, a good flame retarding effect is obtained with the halogen-containing flame retarder alone, but using a flame retarding assistant (e.g. antimony trioxide, zirconium dioxide) together with the retarder is desirable because the flame retarding property can further be improved. The amount of flame retarding assistant added is 1 to 10 parts by weight based on 100 parts by weight of the styrene resin. When the amount is less than 1 part by weight, the effect as an assistant is not sufficient. The effect is not very much improved even when the amount exceeds 10 parts by weight, and besides other physical properties are sometimes damaged.

The inorganic compounds used in the present invention include inorganic hydrate compounds and magnesium compounds. The former compounds include diatomaceous earth, talc and kaolin which contain water of crystallization in their normal structure and release water by thermal decomposition, and alumina hydrates having crystal structures such as gibbsite type [$\alpha$-Al(OH)$_3$], bayerite type [$\beta$-Al(OH)$_3$] and boehmite type [$\alpha$-AlO(OH)]. The latter compounds include magnesium hydroxide, magnesium oxide and basic magnesium carbonate. Particularly preferred inorganic hydrate compounds are diatomaceous earth and kaolin, and particularly preferred magnesium compounds are magnesium hydroxide and magnesium oxide. They remarkably improve the weather durability.

In the present invention, a proper weight ratio of the styrene resin to the inorganic compound is 100 parts by weight to 0.1 to 10 parts by weight.

For example, when a required flame retarding property is of a level corresponding to V-2 in UL Standard, the amount of flame retarder added is relatively small as described above, and therefore a small amount of inorganic compound is sufficient. But, when the amount is less than 0.1 part by weight based on 100 parts by weight of the styrene resin, the weather durability can not be improved sufficiently. Also, when the required flame retarding property is of such a high level as V-1 or V-0 in UL Standard, the amount of flame retarder added is relatively large as described above, and therefore the amount of inorganic compound also increases. But, when the amount exceeds 10 parts by weight based on 100 parts by weight of the sytrene resin, the weather durability is possibly lowered and other physical properties are sometimes damaged. As described above, the weather durability improving effect of the inorganic compound tends to lower when the amount of the compound exceeds the definite upper limit. This seems to mean that this effect is very unique and is not explained by the masking phenomenon alone of the inorganic compound.

In the present invention, a good weather durability improving effect can be obtained with the inorganic compound alone, but using a commercially available ultraviolet ray absorber together with the inorganic compound is more desirable because the weather durability can further be improved. Particularly, in order to produce resin compositions having a flame retarding property corresponding to V-1 or V-0 and an extremely superior weather durability by using decabromodiphenyl ether as the flame retarder and the magnesium compound as the inorganic compound, the addition of an ultraviolet ray absorber is recommended.

As the ultraviolet ray absorber used in the present invention, any of benzotriazole type, benzophenone type, salicylate type ones and mixtures thereof is used with a good effect. The benzotriazole type absorbers include 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)-5-chlorobenzotriazole (such as Tinuvin 327, trade name, produced by Ciba-Geigy) and the like. The benzophenone type absorbers include 2-hydroxy-4-methoxybenzophenone, 2,2'-dihydroxy-4-methoxybenzophenone and the like. The salicylate type absorbers include phenyl salicylate, 4-octylphenyl salicylate and the like.

In the present invention, a proper amount of the ultraviolet ray absorber added is 0.1 to 5 parts by weight based on 100 parts by weight of the styrene resin. For example, when required flame retardant compositions are of a level corresponding to V-2 of UL Standard, the amount of flame retarder added is so small that the weather durability can sufficiently be improved by addition of the inorganic compound alone. But, when required flame retardant compositions are of such a high level as V-1 or V-0 of UL Standard, the amount of flame retarder added increases. Consequently, the recovery of weather durability is not always sufficient by addition of the inorganic compound alone, and it is achieved by combined use of the ultraviolet ray absorber and the inorganic compound. Even when the amount exceeds 5 parts by weight, the weather durability is not very much improved, and the flame retarding property and impact strength are lowered.

In the present invention, the following combinations are particularly preferred for the preparation of the present resin composition having both a high flame retarding property and a high weather durability;

tribromophenyl 1,3-dibromoisobutyl ether-diatomaceous earth, which imparts to the styrene resin a flame retarding property corresponding to V-2 of the UL Standard, tetrabromobisphenol A, hexabromobenzene or decabromodiphenyl ether-diatomaceous earth-2-(2'-hydroxy-3',5'-di-tert.-butylphenyl)-5-chlorobenzotriazole, and decabromodiphenyl ether-magnesium hydroxide or oxide-2-(2'-hydroxy-3',5'-di-tert.-butylphenyl)-5-chlorobenzotriazole, which combinations may contain antimony trioxide and impart to the styrene resin a flame retarding property corresponding to V-1 or V-0.

The flame retardant resin compositions of the present invention may contain various additives conventionally added to styrene resins, for example, antioxidants, lubricants, thermal stabilizers, antistatic agents, dyes and pigments.

The flame retardant resin compositions of the present invention can be produced by various methods. For example, they are produced by blending the foregoing styrene resin, halogen-containing flame retarder, and inorganic compound (and if desired the ultraviolet ray absorber) with or without the additive according to the usual methods, for example using a blender such as a ribbon blender, drum blender, Henschel mixer or the like. Alternatively, the blends thus obtained are further kneaded in a molten state using a hot roll mill, Bumbury's mixer or an extruder. The flame retardant resin compositions of the present invention thus obtained can easily be molded into various forms by the well-known molding processes such as injection molding, extrusion molding and the like. The thus obtained resin compositions of the present invention are remarkably superior to the conventional flame retardant styrene resins in the overall evaluation of the flame retarding property and the weather durability. The present invention will be illustrated in more detail with reference to the following examples, but the present invention is not limited to these examples.

EXAMPLE 1

Esbrite 500HM beads (rubber-modified polystyrene beads produced by Nippon Polystyrene Co.), Pyroguard SR-100 or Puraneron DB-101 (both are a halogen-containing flame retarder, the former is produced by Dai-ichi Kogyo Seiyaku Co. and the latter produced by Mitsui Toatsu Fine Co.), antimony trioxide (flame retarding assistant produced by Sumitomo Kinzoku Kozan Co.), diatomaceous earth or kaolin (both are an inorganic hydrate compound produced by Nakarai Kagaku Co.) were first pre-mixed in amounts shown in Table 1 using a stirring type mixer. The mixture thus obtained was kneaded through a 40 mm$\phi$ extruder at a cylinder temperature of 200° C. and a screw revolution of 40 rpm, followed by pelletizing. The pellets obtained were injection-molded into test pieces on a 3-ounce in-line type injection molding machine at a cylinder temperature of 200° C. The inflammability test and weathering test were carried out using the test pieces thus obtained. The results obtained are shown together in Table 1. As is apparent from Table 1, the weather durability of the rubber-modified polystyrene resin is markedly improved by mixing the resin and both the halogen-containing flame retarder and the inorganic hydrate compound, and at the same time the flame retarding property of the resin is also excellent.

Table 1

(Unit of amount added: part by weight)

| Item No. | Styrene resin 500HM | Halogen-containing flame retarder Name | Amount added | Flame retarding assistant Antimony trioxide |
|---|---|---|---|---|
| Reference example 1 | 100 | — | — | — |
| Reference example 2 | 100 | Pyroguard SR-100 | 5 | — |
| Reference example 3 | 100 | Puraneron DB-101 | 10 | 3 |
| Example 1 | 100 | Pyroguard SR-100 | 5 | — |
| Example 2 | 100 | Pyroguard SR-100 | 5 | — |
| Example 3 | 100 | Puraneron DB-101 | 10 | 3 |
| Example 4 | 100 | Puraneron DB-101 | 10 | 3 |

| Inorganic hydrate compound Name | Amount added | Flame retarding property (a) | Weather durability (b) (Time) 0 | 50 | 100 | 150 | 200 |
|---|---|---|---|---|---|---|---|
| — | — | Burning | O | O | O | O | O |
| — | — | V-2 | O | O | Δ | XX | XX |
| — | — | V-2 | O | X | XX | XX | XX |
| Diatomaceous earth | 0.5 | V-2 | O | O | O | O | Δ |
| Kaolin | 0.5 | V-2 | O | O | O | O | Δ |
| Diatomaceous earth | 0.5 | V-2 | O | O | O | Δ | Δ |
| Kaolin | 0.5 | V-2 | O | O | O | Δ | α |

Note:
(a) In accordance with UL-94 Flame test
(b) The test pieces were exposed to a weather-O-meter (produced by Shimadzu Co., Ltd.) for a definite time and visually observed for color change.
Evaluation:
O: No color change
Δ: Slight color change
X: Considerable color change
XX: Large color change

EXAMPLE 2

Esbrite 500HM beads (rubber-modified polystyrene beads produced by Nippon Polystyrene Co.), Tufprene (styrene-butadiene copolymer rubber produced by Asahi Kasei Co.), Puraneron DB-101, FR-B or Fireguard FG-2000 (the three are a halogen-containing flame retarder, the first is produced by Mitsui Toatsu Fine Co., the second produced by Nippo Kagaku Co. and the last produced by Teijin Kasei Co.), antimony trioxide (Sumitomo Kinzoku Kozan Co.), kaolin, diatomaceous earth or alumina monohydrate (the three are all produced by Nakarai Kagaku Co.) and Tinuvin 327 (Ciba-Geigy Co.) were mixed in amounts shown in Table 2 in the same manner as in Example 1. The mixtures were then molded into pre-determined test pieces and used for the tests.

The results obtained are shown together in Table 2.

As is apparent from Table 2, the weather durability of the styrene resin is markedly improved by mixing the resin and all of the halogen-containing flame retarder, inorganic hydrate compound and ultraviolet ray absorber, and at the same time the flame retarding property is also excellent.

Table 2

(Unit of amount added: part by weight)

| Item No. | Styrene resin 500HM | Tufprene | Halogen-containing flame retarder Name | Amount added | Flame retarding assistant Antimony trioxide |
|---|---|---|---|---|---|
| Reference example 1 | 90 | 10 | Puraneron DB-101[1] | 15 | 5 |
| Reference example 2 | 90 | 10 | Puraneron DB-101 | 15 | 5 |
| Reference example 3 | 90 | 10 | FR-B[2] | 20 | 5 |
| Reference example 4 | 90 | 10 | Fireguard FG-2000[3] | 25 | 5 |
| 1 | 90 | 10 | Puraneron DB-101 | 15 | 5 |
| 2 | 90 | 10 | Puraneron DB-101 | 15 | 5 |

Table 2-continued

| | | | | (Unit of amount added: part by weight) | | | |
|---|---|---|---|---|---|---|---|
| | | 3 | 90 | 10 | Puraneron DB-101 | 15 | 5 |
| Example | | 4 | 90 | 10 | FR-B | 20 | 5 |
| | | 5 | 90 | 10 | FR-B | 20 | 5 |
| | | 6 | 90 | 10 | Fireguard FG-2000 | 25 | 5 |
| | | 7 | 90 | 10 | Fireguard FG-2000 | 25 | 5 |

Note:
[1]Puraneron DB-101 Decabromodiphenyl ether
[2]FR-B Hexabromobenzene
[3]Fireguard FG-2000 Tetrabromobisphenol A
(a) Same as in Table 1
(b) Same as in Table 1

| Inorganic hydrate compound | | Ultraviolet ray absorber | | Flame retarding property (a) | Weather durability (b) | | | | |
|---|---|---|---|---|---|---|---|---|---|
| Name | Amount added | Name | Amount added | | (Time) 0 | 50 | 100 | 150 | 200 |
| — | — | — | — | V-0 | O | X | XX | XX | XX |
| — | — | Tinuvin 327 | 1 | V-0 | O | Δ | Δ | X | X |
| — | — | Tinuvin 327 | 1 | V-0 | O | X | XX | XX | XX |
| — | — | Tinuvin 327 | 1 | V-0 | O | Δ | X | XX | XX |
| Diatomaceous earth | 1 | Tinuvin 327 | 1 | V-0 | O | O | O | O | Δ |
| Kaolin | 1 | Tinuvin 327 | 1 | V-0 | O | O | O | O | Δ |
| Alumina monohydrate | 1 | Tinuvin 327 | 1 | V-0 | O | O | O | O | Δ |
| Diatomaceous earth | 2 | Tinuvin 327 | 1 | V-0 | O | O | O | Δ | Δ |
| Kaolin | 2 | Tinuvin 327 | 1 | V-0 | O | O | O | Δ | Δ |
| Diatomaceous earth | 3 | Tinuvin 327 | 1 | V-0 | O | O | O | Δ | Δ |
| Kaolin | 3 | Tinuvin 327 | 1 | V-0 | O | O | O | Δ | Δ |

EXAMPLE 3

Esbrite 500HM beads (rubber-modified polystyrene beads produced by Nippon Polystyrene Co.), Tufprene (styrene-butadiene copolymer rubber produced by Asahi Kasei Co.), Puraneron DB-101 (Mitsui Toatsu Fine Co.), antimony trioxide (Sumitomo Kinzoku Kozan Co.), diatomaceous earth (Nakarai Kagaku Co.) and Tinuvin 327 (Ciba-Geigy Co.) were mixed in amounts shown in Table 3 in the same manner as in Example 1. The mixtures were then molded into predetermined test pieces and used for the tests. The results obtained are shown together in Table 3. As is apparent from Table 3, the weather durability of the styrene resin is improved when the weight ratio of styrene to inorganic hydrate compound is 100 parts by weight to 0.1 to 10 parts by weight, and at the same time the flame retarding property of the resin is also excellent.

That is to say, when the proportion of the latter is less than 0.1 part by weight, the weather durability is not improved sufficiently. The weather durability is not very much improved even when the proportion exceeds 10 parts by weight, and besides impact strength is lowered.

Table 3

| Item | | | Halogen-containing flame retarder | | Flame retarding assistant | Inorganic hydrate compound | |
|---|---|---|---|---|---|---|---|
| | Styrene resin | | | Amount | Antimony | | Amount |
| No. | 500HM | Tufprene | Name | added | trioxide | Name | added |
| 1 | 90 | 10 | Puraneron DB-101 | 15 | 5 | Diatomaceous earth | 0.05 |
| 2 | 90 | 10 | " | 15 | 5 | " | 1 |
| 3 | 90 | 10 | " | 15 | 5 | " | 10 |
| 4 | 90 | 10 | " | 15 | 5 | " | 15 |

| Ultraviolet ray absorber | | Flame retarding property (a) | Weather durability (b) | | | | | Impact (c) strength (kg · cm/cm$^2$) |
|---|---|---|---|---|---|---|---|---|
| Name | Amount added | | (Time) 0 | 50 | 100 | 150 | 200 | |
| Tinuvin 327 | 1 | V-0 | O | Δ | Δ | X | X | 7.6 |
| " | 1 | V-0 | O | O | O | O | Δ | 7.5 |
| " | 1 | V-0 | O | O | O | O | Δ | 6.0 |
| " | 1 | V-0 | O | O | O | Δ | Δ | 4.0 |

Note:
(a) Same as in Table 1
(b) Same as in Table 1
(c) In accordance with JIS K-6871 (with notch)

EXAMPLE 4

Esbrite 500HM beads (rubber-modified polystyrene beads produced by Nippon Polystyrene Co.), Tufprene (styrene-butadiene copolymer rubber produced by Asahi Kasei Co.), Puraneron DB-101 (Mitsui Toatsu Fine Co.), antimony trioxide (Sumitomo Kinzoku Kozan Co.), magnesium hydroxide, magnesium oxide or basic magnesium carbonate (the first is produced by Kyowa Kagaku Co. and the latter two produced by Nakarai Kagaku Co.) and Tinuvin 327 (Ciba-Geigy Co.) were first pre-mixed in amounts shown in Table 4 using a stirring type mixer. The mixture thus obtained was kneaded through a 40 mmφ extruder at a cylinder temperature of 200° C. and a screw revolution of 40 rpm, followed by pelletizing. The pellets obtained were injection-molded into test pieces on a 3-ounce in-line type injection molding machine at a cylinder temperature of 200° C. The inflammability test and weathering test were carried out using the test pieces thus obtained. The results obtained are shown together in Table 4.

As is apparent from Table 4, the weather durability of the styrene resin is marked improved by mixing the resin and all of decabromodiphenyl ether, one of magnesium hydroxide, magnesium oxide and basic magnesium carbonate, and the ultraviolet ray absorber. At the same time, the flame retarding property is also excellent.

Kozan Co.), magnesium hydroxide (Kyowa Kagaku Co.) and Tinuvin 327 (Ciba-Geigy Co.) were mixed in amounts shown in Tables 5 and 6 in the same manner as in Example 4. The mixtures were then molded into pre-determined test pieces and used for the tests.

The results obtained are shown together in Tables 5 and 6. As is apparent from Table 5, the weather durability of the styrene resin is improved when the weight ratio of styrene resin to magnesium hydroxide is 100 parts by weight to 0.1 to 10 parts by weight, and at the same time the flame retarding property is also excellent.

Further, as is apparent from Table 6, the weather durability of the styrene resin is improved when the weight ratio of styrene resin to ultraviolet ray absorber is 100 parts by weight to 0.1 to 5 parts by weight, and at the same time the flame retarding property is also excellent.

Table 4

(Unit of amount added: part by weight)

| Item No. | | Styrene resin | | Halogen-containing flame retarder | Flame retarding assistant |
|---|---|---|---|---|---|
| | | 500HM | Tufprene | Puraneron DB-101 | $Sb_2O_3$ |
| Reference example | 1 | 90 | 10 | 15 | 5 |
| | 2 | 90 | 10 | 15 | 5 |
| | 3 | 90 | 10 | 15 | 5 |
| | 4 | 90 | 10 | 15 | 5 |
| | 5 | 90 | 10 | 15 | 5 |
| Example | 1 | 90 | 10 | 15 | 5 |
| | 2 | 90 | 10 | 15 | 5 |
| | 3 | 90 | 10 | 15 | 5 |

| Magnesium hydroxide or oxide | | Ultraviolet ray absorber | | Flame retarding property (a) | Weather durability (b) (Time) | | | | |
|---|---|---|---|---|---|---|---|---|---|
| Name | Amount added | Name | Amount added | | 0 | 50 | 100 | 150 | 200 |
| — | — | — | — | V-0 | O | X | X | XX | XX |
| — | — | Tinuvin 327 | 1 | V-0 | O | Δ | Δ | X | X |
| $Mg(OH)_2$ | 1 | — | — | V-0 | O | Δ | Δ | X | X |
| MgO | 1 | — | — | V-0 | O | Δ | Δ | X | X |
| $MgCO_3$ | 1 | — | — | V-0 | O | Δ | Δ | X | X |
| $M-(OH)_2$ | 1 | Tinuvin 327 | 1 | V-0 | O | O | O | O | Δ |
| MgO | 1 | Tinuvin 327 | 1 | V-0 | O | O | O | O | Δ |
| $MgCO_3$ | 1 | Tinuvin 327 | 1 | V-0 | O | O | O | O | Δ |

Note:
(a) In accordance with UL-94 Flame test.
(b) The test pieces were exposed to a weather-O-meter (produced by Shimadzu Co., Ltd.) for a definite time and visually observed for color change.
Evaluation:
O: No color change
Δ: Slight color change
X: Considerable color change
XX: Large color change

EXAMPLES 5 and 6

Esbrite 500HM beads (rubber-modified polystyrene beads produced by Nippon Polystyrene Co.), Tufprene (styrene-butadiene copolymer rubber produced by Asahi Kasei Co.), Puraneron DB-101 (Mitsui Toatsu Fine Co.), antimony trioxide (Sumitomo Kinzoku lent. That is to say, when the proportion of the latter is less than 0.1 part by weight, the weather durability is not improved sufficiently. The weather durability is not very much improved even when the proportion exceeds 5 parts by weight, and besides the physical properties such as flame retarding property are lowered.

Table 5

(Unit of amount added: part by weight)

| | Styrene resin | | Halogen-containing flame retarder | Flame retarding assistant | Magnesium hydroxide | |
|---|---|---|---|---|---|---|
| No. | 500HM | Tufprene | Puraneron DB-101 | $Sb_2O_3$ | Name | Amount added |
| 1 | 90 | 10 | 15 | 5 | $Mg(OH)_2$ | 0.05 |
| 2 | 90 | 10 | 15 | 5 | $Mg(OH)_2$ | 1 |
| 3 | 90 | 10 | 15 | 5 | $Mg(OH)_2$ | 10 |
| 4 | 90 | 10 | 15 | 5 | $Mg(OH)_2$ | 15 |

| Ultraviolet ray absorber | | Flame retarding property (a) | Weather durability (b) (Time) | | | | |
|---|---|---|---|---|---|---|---|
| Name | Amount added | | 0 | 50 | 100 | 150 | 200 |

Table 5-continued

| | | (Unit of amount added: part by weight) | | | | | |
|---|---|---|---|---|---|---|---|
| Tinuvin 327 | 1 | V-0 | O | Δ | Δ | Δ | X |
| Tinuvin 327 | 1 | V-0 | O | O | O | O | Δ |
| Tinuvin 327 | 1 | V-0 | O | O | O | O | Δ |
| Tinuvin 327 | 1 | V-0 | O | O | O | Δ | Δ |

Note:
(a) Same as in Table 4
(b) Same as in Table 4

Table 6

| | (Unit of amount added: part by weight) | | | | | |
|---|---|---|---|---|---|---|
| Item | Styrene resin | | Halogen-containing flame retarder | Flame retarding assistant | Magnesium hydroxide | |
| No. | 500HM | Tufprene | Puraneron DB-101 | Sb$_2$O$_3$ | Name | Amount added |
| 1 | 90 | 10 | 15 | 5 | Mg(OH)$_2$ | 1 |
| 2 | 90 | 10 | 15 | 5 | Mg(OH)$_2$ | 1 |
| 3 | 90 | 10 | 15 | 5 | Mg(OH)$_2$ | 1 |
| 4 | 90 | 10 | 15 | 5 | Mg(OH)$_2$ | 1 |

| Ultraviolet ray absorber | | Flame retarding property (a) | Weather durability (b) | | | | |
|---|---|---|---|---|---|---|---|
| Name | Amount added | | (Time) 0 | 50 | 100 | 150 | 200 |
| Tinuvin 327 | 0.05 | V-0 | O | Δ | Δ | Δ | X |
| Tinuvin 327 | 1 | V-0 | O | O | O | O | Δ |
| Tinuvin 327 | 5 | V-0 | O | O | O | O | O |
| Tinuvin 327 | 10 | V-2 | O | O | O | O | O |

Note:
(a) Same as in Table 4
(b) Same as in Table 4

What is claimed is:

1. A resin composition comprising
(1) a styrene resin selected from the group consisting of polystyrene, rubber-modified polystyrene, polymethyl styrene, styrene-butadiene copolymers, styrene-acrylonitrile copolymers and styrene-butadiene-acrylonitrile terpolymers,
(2) 3 to 40 parts by weight based on 100 parts by weight of the styrene resin of a halogen-containing flame retarder selected from the group consisting of tetrabromobisphenol A, tetrabromophthalic anhydride, hexabromobenzene, pentabromotoluene, pentabromophenol, tris(2,3-dibromopropyl)phosphate, tris(2-chloro-3-bromopropyl)phosphate, tribromophenyl allyl ether, tribromophenyl 2,3-dibromopropyl ether, tribromophenyl 1,3-dibromoisobutyl ether, octabromodiphenyl ether, decabromodiphenyl ether, octabromobiphenyl, pentachloropentacyclodecane and hexabromocyclododecane, and
(3) as an inorganic compound 0.1 to 10 parts by weight based on 100 parts by weight of the syrene resin of (a) at least one inorganic hydrate compound selected from alumina hydrate and talc, or (b) at least one magnesium compound selected from magnesium hydroxide, magnesium oxide and basic magnesium carbonate,
provided that the halogen-containing flame retarder is decabromodiphenyl ether in an amount of 11 to 30 parts by weight based on 100 parts by weight of the styrene resin when the inorganic compound is the magnesium compound.

2. The composition according to claim 1, wherein the composition further comprises 0.1 to 5 parts by weight based on 100 parts by weight of the styrene resin of an ultraviolet ray absorber.

3. The composition according to claim 2, wherein the ultraviolet ray absorber is at least one member selected from 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)-5-chlorobenzotriazole, 2-hydroxy-4-methoxybenzophenone, 2,2'-dihydroxy-4-methoxybenzophenone, phenyl salicylate and 4-octylphenyl salicylate.

4. The composition according to claim 1, wherein the composition further comprises a flame retarding assistant selected from antimony trioxide and zirconium dioxide.

5. The composition according to claim 1, wherein the composition comprises 11 to 30 parts by weight based on 100 parts by weight of the styrene resin of decabromodiphenyl ether as the halogen-containing flame retarder and 0.1 to 10 parts by weight based on 100 parts by weight of the styrene resin of the magnesium compound as defined in claim 1 as the inorganic compound, and further comprises 0.1 to 5 parts by weight based on 100 parts by weight of the styrene resin of an ultraviolet ray absorber.

6. The composition according to claim 1, wherein the halogen-containing flame retarder is tribromophenyl 1,3-dibromoisobutyl ether.

7. The composition according to claim 2, wherein the halogen-containing flame retarder is one member selected from tetrabromobisphenol A, hexabromobenzene and decabromodiphenyl ether, and the ultraviolet ray absorber is 2-(2'-hydroxy-3',5'-di-tert-butylphenyl)-5-chlorobenzotriazole.

8. The composition according to claim 5, wherein the magnesium compound is magnesium hydroxide or magnesium oxide, and the ultraviolet ray absorber is 2-(2'-hydroxy-3',5'-di-tert-butylphenyl)-5-chlorobenzotriazole.

* * * * *